Dec. 4, 1956  S. LANDELL  2,772,924
WHEEL COVER
Filed Aug. 24, 1953
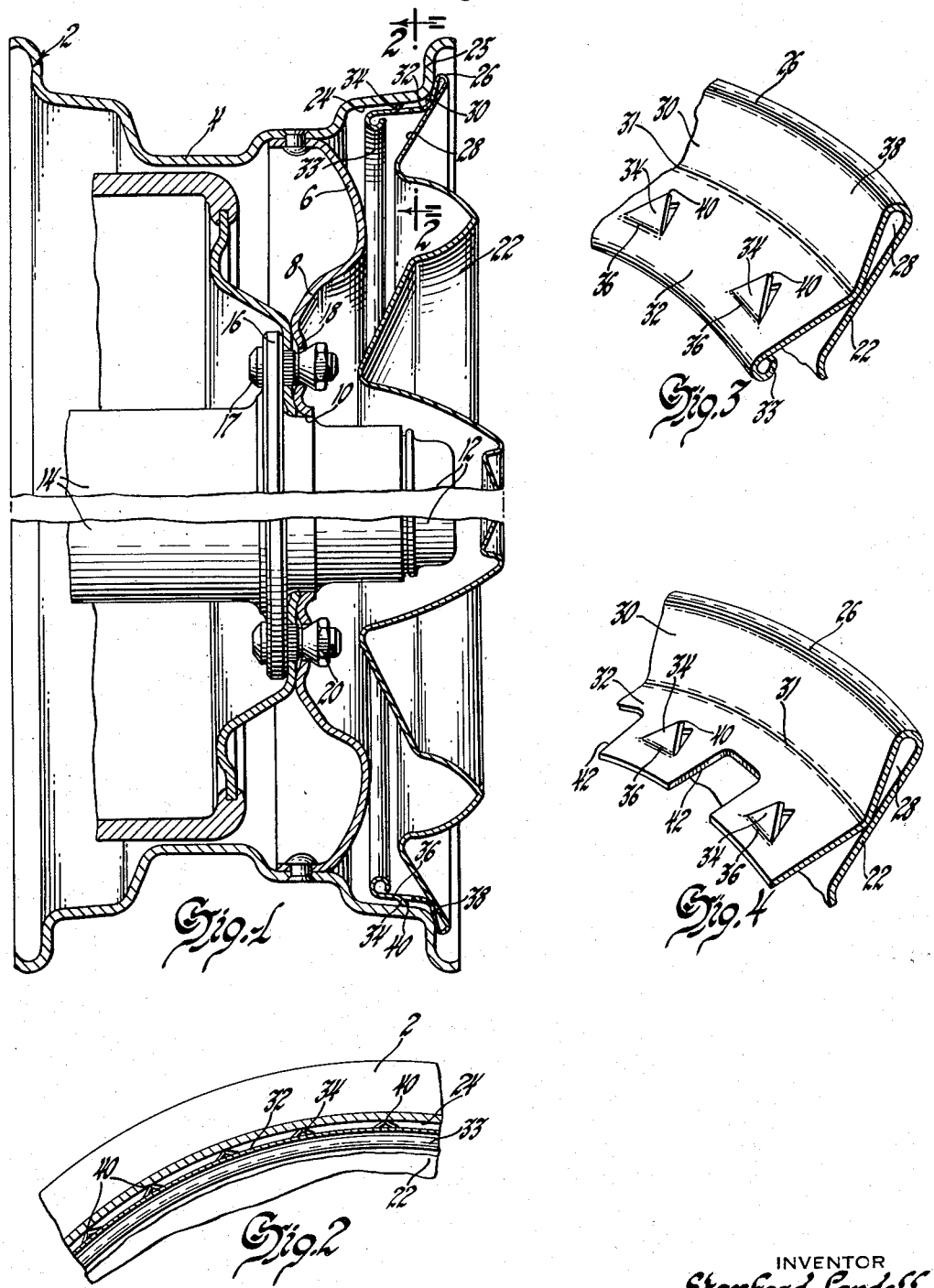
INVENTOR
Stanford Landell
BY C. H. Sibbe
ATTORNEY

United States Patent Office 2,772,924
Patented Dec. 4, 1956

2,772,924

WHEEL COVER

Stanford Landell, Fayetteville, N. Y., assignor to General Motors Corporation, Detroit, Mich., a corporation of Delaware Application August 24, 1953, Serial No. 376,097

1 Claim. (Cl. 301—37)

This invention relates to vehicle wheel covers and more particularly to one-piece cover constructions having improved and simplified retaining means.

An object of the invention is to provide a unitary cover structure having integral resilient cover retaining means formed thereon.

Another object is to provide a unitary cover structure of the type adapted for positioning on a wheel rim upon application of axial pressure, wherein there is provided a peripheral pilot flange adapted to eliminate difficulty of initial alignment of the cover with the vehicle wheel rim.

A further object is to provide a wheel cover having resilient retaining means which are so constructed and arranged as to be radially inwardly flexible during application, yet provide rigid biting engagement when in adjusted position.

These and other objects and advantages of the invention will more fully appear from the following detailed description, reference being made to the accompanying drawings wherein:

Fig. 1 is a front elevational view, partly in section, of a vehicle wheel and a cover structure embodying the features of the invention.

Fig. 2 is an enlarged fragmentary view of a portion of the wheel and cover structure taken substantially along the lines 2—2 of Fig. 1.

Fig. 3 is an enlarged fragmentary perspective view of a portion of the cover structure showing the details of construction of the retaining means, and Fig. 4 is an enlarged fragmentary perspective view similar to Fig. 3 illustrating a modified construction of the retaining means.

Referring now to the drawings, and particularly Fig. 1, there is illustrated a conventional vehicle wheel 2 of the type having a multi-flanged drop center rim 4 secured about the periphery of an outwardly bowed load supporting wheel body 6. Wheel body 6 is provided with a dished central portion 8 having a flanged circular aperture 10 formed therein and adapted for slidable cooperation with the hub portion 12 of a vehicle axle 14. Axle 14 is provided with an integral circular bolt-on flange 16 having circumferentially spaced wheel bolts 17 secured therein which extend through complementary circumferentially spaced apertures 18 formed in the dished portion 8 of wheel body 6. After wheel 2 is placed in position on vehicle axle 14, wheel nuts 20 are drawn up tightly to secure the wheel on the axle.

Disposed in cooperating relation with the outer surface of wheel 2 is a circular wheel cover 22 which, as illustrated, is in the form of a disc of compound contour in cross section. Since the cross-sectional contour of cover 22 forms no part of the invention, it will be understood that any desired configuration may be adopted. Cover 22 is provided with novel retaining means which permit the cover to be simply and easily applied to the wheel by initially axially aligning the cover over the wheel opening formed by the intermediate flange 24 or rim 4 and applying manual pressure to force the cover into flush relation with the annular shoulder 25 or rim 4. In accordance with the present invention, cover 22 is provided with a rearwardly inturned outer periphery 26 which extends inwardly in converging relation with the rear surface 28 of cover 22 to form an inclined annular flange 30. At its radially inner margin 31, flange 30 is turned rearwardly to provide an axially directed annular flange 32, which in turn is formed with an inturned peripheral bead 33 at its terminal edge.

As seen best in Fig. 1, axial flange 32 is preferably of a diameter slightly less than the inside diameter of the intermediate flange 24 of tire rim 4. Axially intermediate, and spaced circumferentially about axial flange 32 are a continuous series of radially outwardly and axially forwardly directed projections 34 which are formed by lancing forwardly converging pairs of slits in flange 32. Each projection 34 is then struck outwardly from the plane of flange 32 to an angle sufficient to provide resilient gripping engagement with intermediate flange 24 of rim 4. It should be observed that because of the angle of inclination of projections 34, axial inward movement of cover 22 will cause the projections 34 to cam yieldably inwardly about an axis located generally at the juncture 36 of projections 34 and flange 32 until the inner surface 38 of inclined flange 30 engages the annular shoulder 25 of tire rim 4. However, because of the angle of engagement of projections 34 with intermediate flange 24, axial outward movement of cover 22 is resisted. It will be seen that any axial outward movement of cover 22 will cause the points 40 of projections 34 to dig into intermediate flange 24. Further axial outward movement of the cover will tend to spring projections 34 upwardly, thus increasing the biting engagement effected by the points 40. Consequently, any tendency of the cover 22 to creep axially outwardly will result in the projections 34 establishing a progressively increasing positive grip on the intermediate flange 24.

It should also be noted that by controlling the diameter of retainer flange 32, the angle of inclination of projections 34 may be relatively slight, so that the major thrust component resulting from axial outward movement of the cover 22 very nearly parallels the planes in which projections 34 possess the maximum inherent rigidity, thus reducing the likelihood of bending or rolling over the projections. However, when a suitable pry-off tool, not shown, is inserted between the cover margin 26 and the annular shoulder 25 of tire rim 4, retainer flange 32 may be depressed radially inwardly sufficiently to relieve the biting engagement of projections 34 to permit removal of the cover from the wheel.

As previously noted, retainer flange 32 is preferably of a diameter slightly less than the inside diameter of intermediate flange 25 of tire rim 4. In the past, because press-formed articles of this type generally are lacking in circular uniformity, it has occasionally been difficult to initially place the cover in position for installation. In the present invention, the terminal edge of retainer flange 32 may be reduced in diameter sufficiently to obviate any possibility of difficulty in initially positioning the cover for installation. In addition, the provision of inturned peripheral bead 33 assures improved circular uniformity. Consequently, initial alignment of the retainer flange 32 with the wheel opening 25 is greatly enhanced and the difficulty of installation considerably decreased.

In Fig. 4, there is shown a slightly modified form of the invention wherein the axially directed retainer flange 32 is provided with notches 42 which are spaced alternately between the struck-up projections 34. By providing suitably shaped notches 42, any desired degree of flexibility may be imparted to the retainer flange 32, which may then function as auxiliary resilient means tending to reduce the possibility of elastic fatigue at the juncture 36 of projections 34 and flange 32.

From the foregoing it will be seen that there has been provided a one-piece wheel cover construction having novel retaining means which require substantially fewer forming operations, yet are efficient and durable in operation.

While but two embodiments of the invention have been shown and described, it will be apparent that other changes and modifications may be made therein. It is, therefore, to be understood that it is not intended to limit the invention to the embodiments shown but only by the scope of the claim which follows.

I claim:

A wheel cover structure for a vehicle wheel having a multi-flanged tire rim, said cover structure comprising a concave-convex outer portion having a rearwardly inturned outer marginal portion, a radially inclined annular flange, an axially rearwardly directed continuous flange integral with said inclined flange, said axially directed flange being provided intermediate thereof at spaced intervals with integral V-shaped struck-out portions having their pointed ends directed radially outwardly and axially forwardly from the surface thereof, said V-shaped portions being connected to said axially directed flange at their axially rearwardmost extremity and being adapted to flex inwardly when said cover is forced axially inwardly on said wheel and to bitingly engage a portion of said rim parallel with said axially directed flange to prevent axial outward movement of said cover, and a peripheral inturned bead on said axially directed flange providing a pilot perimeter for initially locating said cover on said wheel.

References Cited in the file of this patent

UNITED STATES PATENTS

| 2,607,632 | Lyon | Aug. 19, 1952 |
| 2,660,478 | Lyon | Nov. 24, 1953 |

FOREIGN PATENTS

| 417,906 | Great Britain | Oct. 15, 1934 |
| 374,096 | Italy | Aug. 14, 1939 |